United States Patent [19]

Mathauser

[11] 3,742,777
[45] July 3, 1973

[54] HYDRAULICALLY OPERATED SHIFT MECHANISM FOR BICYCLES AND THE LIKE

[76] Inventor: William R. Mathauser, P.O. Box 5, Sun Valley, Idaho 83353

[22] Filed: July 18, 1972

[21] Appl. No.: 272,985

Related U.S. Application Data

[63] Continuation-in-part of Ser. No. 234,573, March 14, 1972, abandoned, which is a continuation-in-part of Ser. No. 181,169, Sept. 16, 1971, abandoned.

[52] U.S. Cl. .............................. 74/242.3, 74/217 B
[51] Int. Cl. ............................................. F16h 7/08
[58] Field of Search ...................... 74/242.3, 217 B, 74/217 R, 242.4, 242.15 B; 60/54.5 R

[56] References Cited
UNITED STATES PATENTS
425,471    4/1890    Toense............................. 60/54.5 R

Primary Examiner—Leonard H. Gerin
Assistant Examiner—Frank H. McKenzie, Jr.
Attorney—Luke A. Mattare, John F. Smith et al.

[57] ABSTRACT

A hydraulically actuated shifting mechanism for bicycles and the like, wherein operating lever means is carried on the handlebar of the bicycle or the like and is operatively connected to operate a hydraulic master cylinder means for causing operation of a hydraulically operated slave cylinder means adjacent the sprocket of the bicycle for operating a derailleur mechanism to cause the chain of the bicycle to shift from one size sprocket to another size sprocket to change the gear ratio of the bicycle or the like.

21 Claims, 19 Drawing Figures

PATENTED JUL 3 1973 3,742,777

HYDRAULICALLY OPERATED SHIFT MECHANISM FOR BICYCLES AND THE LIKE

BACKGROUND OF THE INVENTION

This application is a continuation-in-part application of application Ser. No. 234,573, filed Mar. 14, 1972, now abandoned and entitled HYDRAULICALLY OPERATED SHIFT MECHANISM FOR BICYCLES AND THE LIKE, which is a continuation-in-part of application Ser. No. 181,169, filed Sept. 16, 1971, now abandoned and entitled HYDRAULICALLY OPERATED SHIFT MECHANISM FOR BICYCLES AND THE LIKE.

Multiple speed bicycles are known in the prior art and several different types of shifting mechanisms are provided for accomplishing changes in the gear ratio of such multiple speed bicycles. In most of these prior art systems, an operating lever is mounted to the crossframe member of the bicycle and a cable extends from the operating lever along the frame to a derailleur mechanism supported by the frame adjacent the sprocket of the bicycle. Operation of the lever causes operation of the derailleur mechanism to shift the chain from one size sprocket to another size sprocket to change the gear ratio of the bicycle. This type of system has several disadvantages. By putting the operating lever on the cross-frame member of the bicycle, the rider must remove one hand from the handlebars to grasp the lever to change the gear ratio of the bicycle; and when this is done, the rider has less control of the bicycle and there is greater likelihood of an accident occurring. Moreover, when one hand is moved from the handlebar, the rider is not capable of exerting as much pressure on the pedals of the bicycle and accordingly, it is difficult to maintain a desired speed during the time the rider is attempting to shift gears on the bicycle. Moreover, in prior art systems wherein the operating means for the brakes of the bicycle comprises a hand operated lever mounted on the handlebar, it is practically impossible for the rider to manipulate the brakes and at the same time change gears. Further, conventional cable operated systems are quite complicated and difficult to assemble and work on and are susceptible to damage and excessive wear and tear.

In the cable operated systems, the cable tends to stretch over a period of time and thus the derailleur mechanism needs to be adjusted in order to effect proper shifting of gears. Additionally, the cable frequently becomes rusted or worn and accordingly will break when a gear change is attempted. The complexity of conventional cable operated systems makes them quite expensive and maintenance of such systems frequently is required to be performed by skilled mechanics thus rendering such devices impractical for a novice bicycle rider; and, in fact, even for most skilled bicycle riders.

The shift mechanism of the present invention is hydraulically operated and is economical to manufacture, simple to install and maintain and eliminates all of the problems which occur with prior art systems as noted above.

In the present invention, a hand operated lever means is mounted on the handlebar of the bicycle in a position to be grasped and operated by the hand of the person riding the bicycle and accordingly, it is not necessary for the rider to remove his hand from the handlebar as in prior art systems. The hydraulically operated means is accurate and fast acting and is not susceptible to stretching or breaking as in prior art cable operated systems. Further, the derailleur mechanism adjacent the sprocket of the bicycle is exceptionally simple in construction and operation as compared with prior art derailleur mechanisms and is therefore much less expensive and complicated to install and maintain.

With a hydraulically operated system, the hydraulic lines and the like comprising a part of the system can be positioned within the frame members of the bicycle and thus protected from damage and corrosion and the like and at the same time greatly improving the appearance of the bicycle. According to one aspect of the invention, the hydraulic shift mechanism is intended to replace the prior art cable operating means and includes a slave cylinder arrangement which is positioned adjacent the sprocket of the bicycle and has means for attachment thereto of a portion of the existing cable on an existing derailleur mechanism whereby operation of the cylinder causes operation of the existing derailleur mechanism. Such an arrangement can be sold as an attachment for existing derailleur mechanisms and thus eliminates the necessity of purchasing a complete derailleur arrangement.

According to another aspect of the invention, the hydraulically operated means includes a modified derailleur mechanism on which a hydraulically operated cylinder means is provided for causing operation of the derailleur mechanism. This type unit could be sold either as a replacement or as an attachment for existing derailleur mechanisms.

According to another aspect of the invention, an extremely simplified derailleur mechanism is provided for attachment to the bicycle adjacent the sprocket means and includes a hydraulically operated cylinder means for effecting a change in the gear ratio of the bicycle through a simple reciprocating movement of an idler assembly engaged with the chain.

If desired, a second operating lever can be provided in all forms of the invention operatively associated with the first operating lever for effecting operation of a second shifting mechanism positioned adjacent the front sprocket of the bicycle for effecting repositioning of the bicycle chain from one size sprocket to another sprocket. This arrangement would be used, for example, with a ten speed bicycle wherein two speed changes are effected at the front sprocket and five speed changes are effected at the rear sprocket. In such an arrangement, each of the two levers is independently operated to effect operation of independent hydraulic systems for effecting independent operation of the shifting mechanism at the front sprocket and at the rear sprocket, respectively.

OBJECTS OF THE INVENTION

It is an object of this invention to provide an exceptionally simple and economical shifting mechanism for bicycles and the like.

Another object of this invention is to provide a hydraulically operated shifting mechanisms for bicycles and the like.

A further object of this invention is to provide a hydraulically operated shifting mechanism which comprises an attachment for existing cable operated systems wherein hydraulically operated means is provided for connection to a portion of the cable in the existing system to effect operation of the shifting mechanism.

Yet another object of this invention is to provide a hydraulically operated shifting mechanism which comprises a replacement for existing cable operated shifting mechanisms and wherein hydraulically operated means is connected for effecting movement of the shifting mechanism.

An even further object of this invention is to provide a hydraulically operated shifting mechanism which is exceptionally simple and which comprises a replacement for existing cable operated shifting mechanisms, said system comprising a reciprocating hydraulically operated means for effecting a gear change through a simple reciprocating motion.

A still further object of this invention is to provide a hydraulically actuated shifting mechanism for a bicycle or the like wherein a shifting means is provided adjacent the front sprocket of the bicycle and a shifting means is provided adjacent the rear sprocket of the bicycle, and a pair of independently operated hand operable lever means are on the handlebar of the bicycle for effecting independent operation of the front and rear shifting means, respectively.

DETAILED DESCRIPTION OF THE INVENTION

Figure 1:
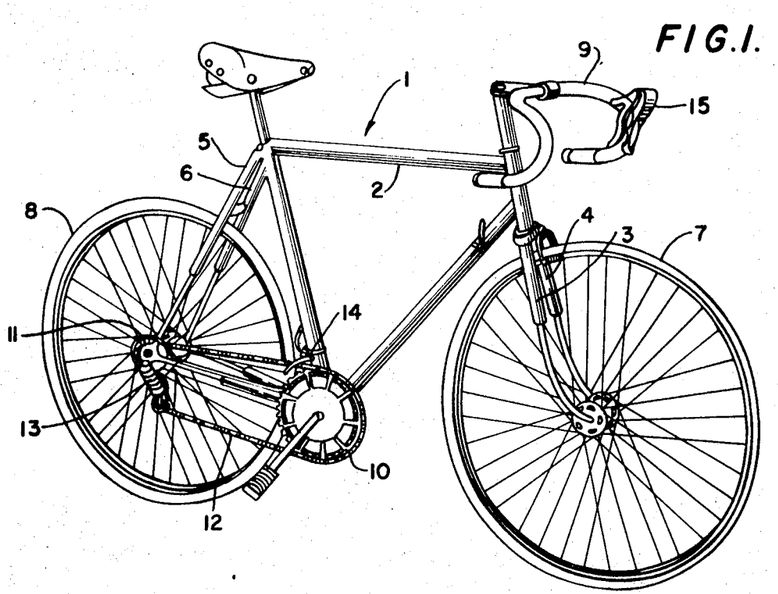
FIG. 1 is a top perspective view of a bicycle having a hydraulically operated shifting mechanism according to the present invention.

Referring now to the drawings, wherein like reference numerals indicate like parts throughout the several views, a bicycle is indicated generally at 1 in FIG. 1 and includes a frame 2 having a pair of spaced apart front forks 3 and 4, a pair of spaced apart rear forks 5 and 6, a front wheel 7 supported in the front forks, a back wheel 8 supported in the rear forks, handlebars 9 connected with the front forks for turning the front forks and the front wheel from side to side, a front drive sprocket set 10 including two different size sprockets connected with the frame for driving a rear sprocket set 11 comprising a plurality of different size sprockets, and a chain 12 wound about one of the sprockets of the front sprocket set 10 and one of the sprockets of the rear sprocket set 11.

A derailleur mechanism 13 is supported on the frame adjacent the rear sprocket set 11 for changing or shifting the chain 12 from one size sprocket to another size sprocket, and a front shifter 14 is supported on the frame 2 adjacent the front sprocket set 10 for effecting shifting of the chain 12 from one size sprocket to another size sprocket.

Figure 2:
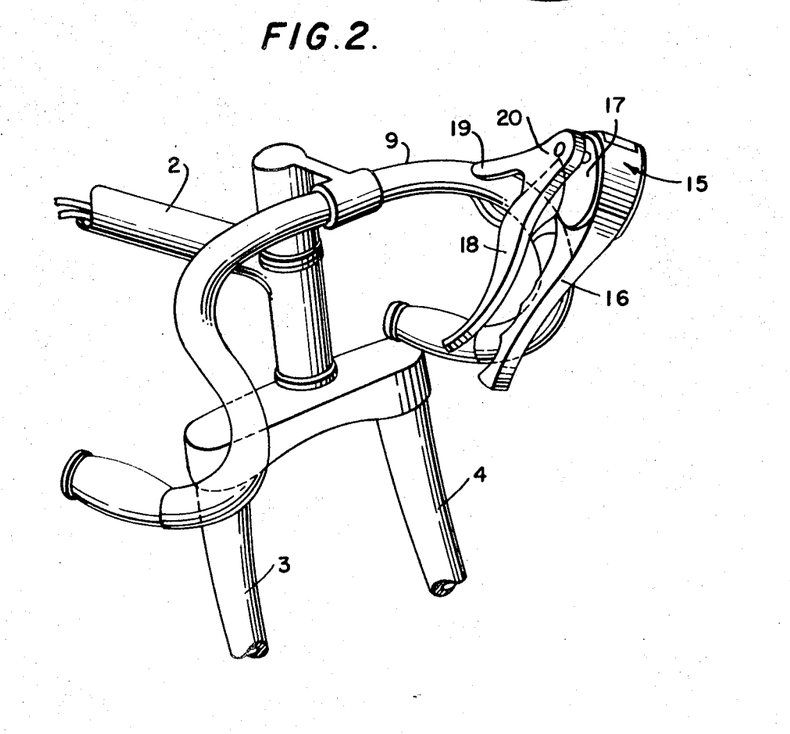
FIG. 2 is a fragmentary perspective view of the bicycle and shifting mechanism shown in FIG. 1.

Hand manipulatable lever means 15 are supported on the handlebar 9 for causing operation of the derailleur mechanisms 13 and front shifter 14 when the levers are operated. As shown in FIG. 2, the lever means 15 comprises a primary lever 16 pivotally mounted in a housing 17 clamped otherwise otherwise suitably secured to the handlebar 9, and a secondary lever 18 pivotally connected against one side of the housing 17. The primary lever 16 is operatively connected in a hydraulic system for operating the derailleur mechanism 13 and the secondary lever 18 is operatively connected in a hydraulic system for effecting operation of the front shifter 14. The secondary lever 18 includes a short projection 19 extending angularly from the main body portion 20 thereof, said angularly extending portion being positioned so as to be easily engaged with the thumb to effect manipulation of the secondary lever.

Referring now particularly to FIGS. 3 through 8, details of the construction and operation of the hand manipulatable lever means can clearly be seen. By way of specific example, the hydraulic shifting mechanism described and illustrated herein is shown as applied to a ten speed bicycle wherein there is a set of five different sized sprocket wheels at the rear hub of the bicycle, and a set of two different sized sprocket wheels at the front sprocket of the bicycle. In order to obtain ten different gear ratios or speeds from the bicycle, the chain is caused to shift to a desired one of the five different sized sprockets at the rear of the bicycle so that five different speeds are available at the rear sprocket, and the chain is caused to move to a desired one of the two sprocket wheels at the front sprocket of the bicycle so that two speeds or changes are accomplished at the front sprockets of the bicycle. By selecting combinations of the two speeds at the front sprocket and the five speeds at the rear sprocket, a total of ten speeds are available. The derailleur 13 and front shifter 14 are independently hydraulically actuated from a pair of independent master cylinders 21 and 22 in the housing 17 carried on the handlebar 9 upon actuation of the levers 16 and 18, respectively. The lever 16 is pivotally mounted at one end between the opposite sides of housing or base 17 by means of a pivot pin 23 extending through the base at the outer end portion thereof. A pair of depending spaced apart parallel flanges or webs 24 and 25 are on the underside of lever 16 adjacent said one end thereof for receiving the flattened end 26 of an actuating rod 27 therebetween. The end 26 is pinned between the flanges 24 and 25 by a suitable pin means 28. The actuating rod 27 is connected at its other end with a piston 29 connected to the end of an axially collapsible and extensible bellows 30 fitted within the cylinder or bore 21 of housing 17.

A conduit 31 extends from the bellows 30 to the derailleur 13 for actuating the derailleur when the lever 16 is pulled toward or away from the handlebar to collapse or extend bellows 30 as the case may be. A click-type indicating and detent mechanism 32 comprising a series of shallow recesses 33 extending along one side of actuating rod 27 and a ball 34 supported on the housing 17 is provided for indicating when the lever has been moved to a position corresponding to one of the sprockets in the rear sprocket set 11 so that the rider is informed when he has moved the lever 16 to a proper position to effect a gear change.

In the particular embodiment described, there are five recesses 33, with each recess corresponding to one of the sprockets in the set of five sprockets in the rear sprocket set 11.

Figure 6:
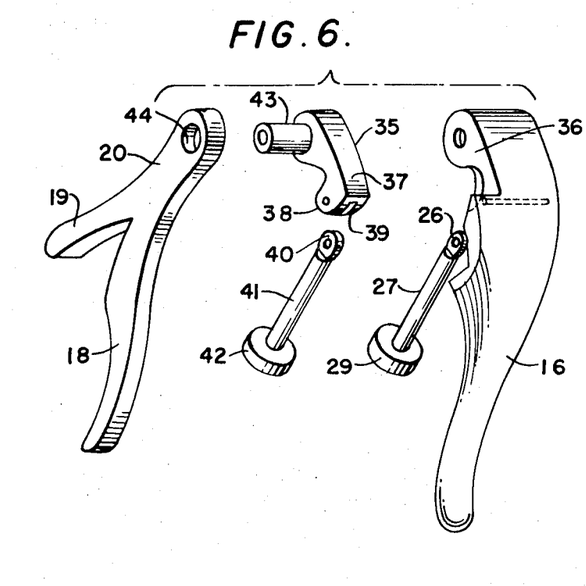
FIG. 6 is an exploded perspective view of the lever means for operating the hydraulic shifter.
Figure 7:
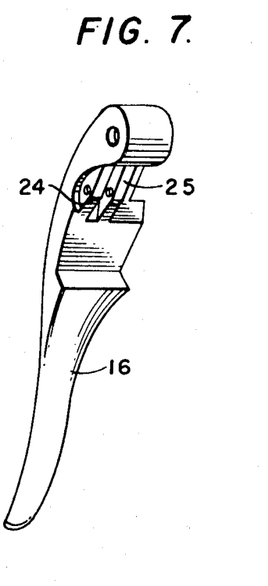
FIG. 7 is a bottom perspective view of the primary lever means of the hydraulic shifter.

As seen best in FIG. 6, a relatively short crank 35 is fitted within a complementary recess 36 in one side of the lever 16 so that the crank 35 and lever 16 fit between the opposed sides of housing or base 17. The crank 35 includes a bifurcated end 37 having depending spaced apart flanges 38 and 39 between which is received the flattened end 40 of a second actuating rod 41. The actuating rod 41 is connected with a piston 42 at the other end thereof and the piston 42 is connected with a bellows 45 fitted within the cylinder 22 in the housing 17 in side-by-side parallel relationship with cylinder 21.

A shaft 43 projects laterally from the other end of the crank 35 and is fitted within a bore 44 in the body 20 of lever 18 so that when the lever 18 is actuated to its different positions, the shaft 43 and crank 35 are turned accordingly to effect reciprocation of the actuating rod 41, piston 42 and the bellows associated therewith to cause operation of the front shifter 14. Suitable conduit means 46 extends from the bellows 45 to the front shifter 14 for establishing communication between the bellows and front shifter mechanism 14.

A suitable clamp means 47 is provided connected with the housing or base 17 for holding the housing and levers to the handlebar 9.

The lever 18 is not as large as the lever 16 since not as much travel of the front shifter is required in order to transfer the chain from one sprocket to the other at the front sprocket set 10 as is required to transfer the chain back and forth between the five sprockets in the rear sprocket set 11.

Figure 3:
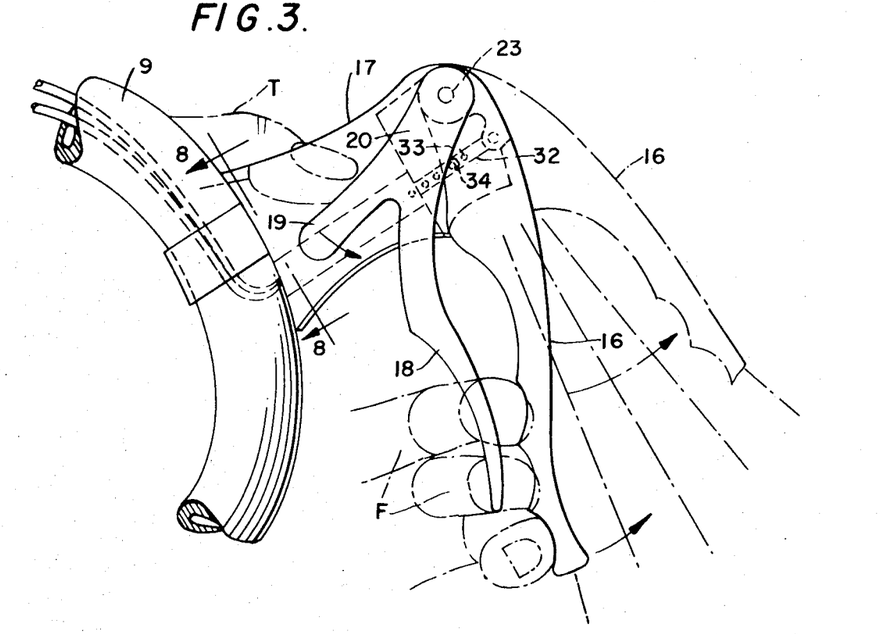
FIG. 3 is a view in elevation of the lever means showing several operative positions thereof.
Figure 4:
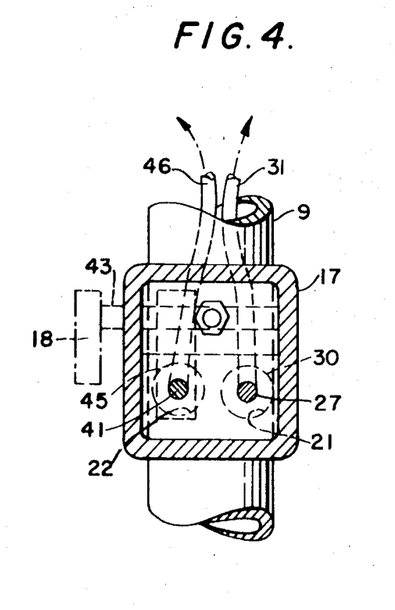
FIG. 4 is a view in section taken along line 4—4 in FIG. 5.
Figure 5:
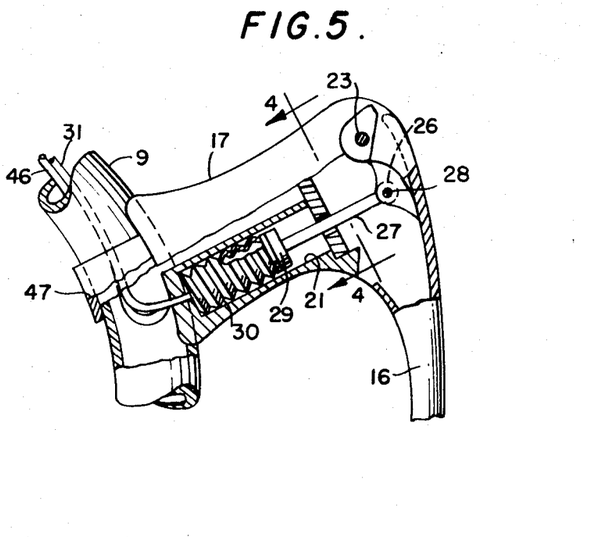
FIG. 5 is a fragmentary view shown partially in section of the master cylinder means of the hydraulic actuator.

When it is desired to effect a speed change at the rear sprocket set 11, the lever 16 is manipulated with the fingers F as shown diagrammatically in FIG. 3 either by pushing the lever away from the handlebar 9 until it clicks into one of its predetermined positions or by pulling the lever toward the handlebar until it clicks into one of it predetermined positions. The lever 16 may be shifted through several positions, if desired, by simply moving it past the detents. The lever 18 may be similarly operated or it may be operated with the thumb T of the hand by pushing against the projection 19.

Figure 8:
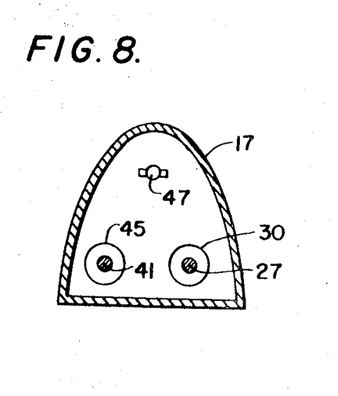
FIG. 8 is a view in section of the housing for the lever means for operating the hydraulic shifter and is taken along line 8—8 in FIG. 3.

As shown in FIG. 8, the base of the housing 17 has a rounded configuration so that the rider of the bicycle will not experience unnecessary discomfort during operation of the bicycle.

Figure 9:
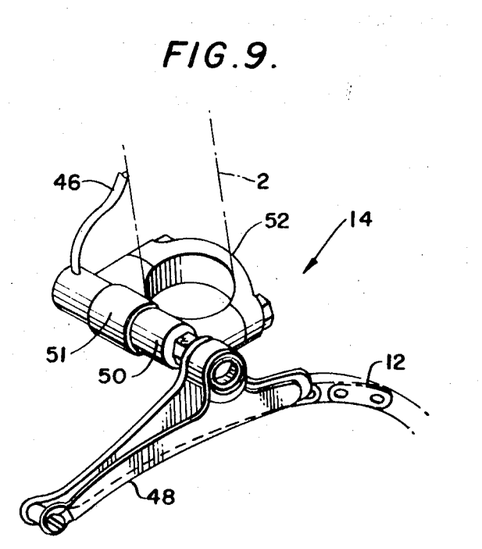
FIG. 9 is a perspective view of the front shifter.

Referring now to FIG. 9, the front shifter 14 is shown and comprises an elongate, generally crescent shaped chain guide 48 of substantially conventional construction for holding and guiding the chain during the course of shifting the chain from one sprocket to another. The chain guide 48 is connected to the end of a piston rod 49 which extends within a slave cylinder 50 and is connected to a piston or bellows or other suitable means within the slave cylinder. The slave cylinder is adjustably supported in a suitable clamp 51 carried by a split clamp means 52 for attaching the shifter 14 to the frame 2 of the bicycle. The conduit 46 leading from bellows 45 in master cylinder 22 is connected at one side of the cylinder 50 for conveying pressure fluid to the cylinder 50 to effect reciprocation of the piston 49 and the chain guide 48 for causing the chain to walk or ride from one sprocket to the other when the lever 18 is operated.

Figure 10:
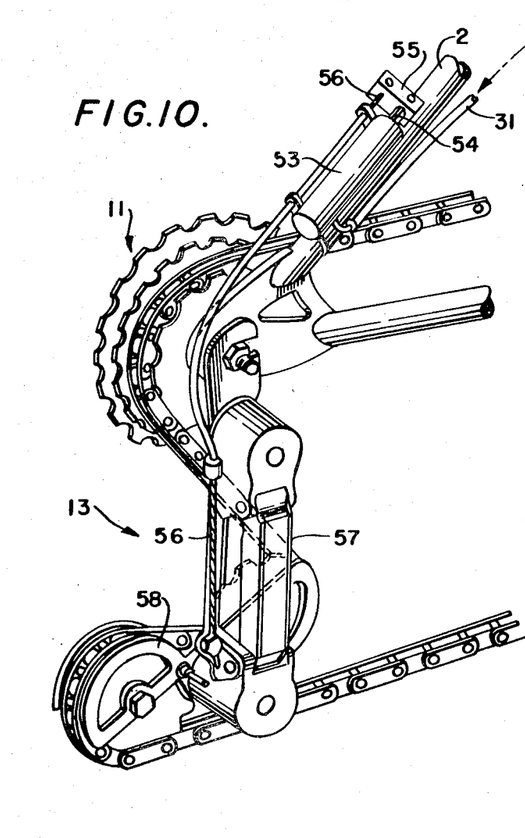
FIG. 10 is a fragmentary perspective view of a first form of hydraulic shifter wherein hydraulically operated means is connected with a portion of existing cable for operating a conventional derailleur mechanism.

Referring now to FIG. 10, a first form of hydraulically actuated means for effecting a transfer of the chain from one sprocket to another at the rear sprocket set 11 is illustrated and comprises an attachment for existing derailleur mechanisms 13. In this form of the invention, a slave cylinder 53 is suitably fixed to the frame 2 as by clamps or the like and includes any suitable means such as a piston or bellows or the like therein for expansion and contraction in response to pressurization of fluid in the line 31. A piston rod 54 extends from within the cylinder 53 and is connected to the piston or bellows or the like therein at one end and is connected at its other end with a small adapter block 55 to cause reciprocation of the block 55 when the piston or bellows or the like is reciprocated within the cylinder 53. The cable 56 of a conventional derailleur mechanism is cut and then connected with the block 55 so that the cable 56 is caused to be reciprocated when the block 55 is reciprocated to effect movement of a conventional parallelogram type mechanism assembly 57 of the derailleur 13 to cause a conventional idler assembly 58 to move the chain from one sprocket to another sprocket in the sprocket set 11 in a conventional and well-known manner. Provision of the cylinder 53 adjacent the rear sprocket set 11 eliminates the long extent of cable which would otherwise be required extending from the derailleur to the operating lever on either the cross frame member or the handlebar and accordingly eliminates the problems which occur with such conventional systems.

Figure 11:
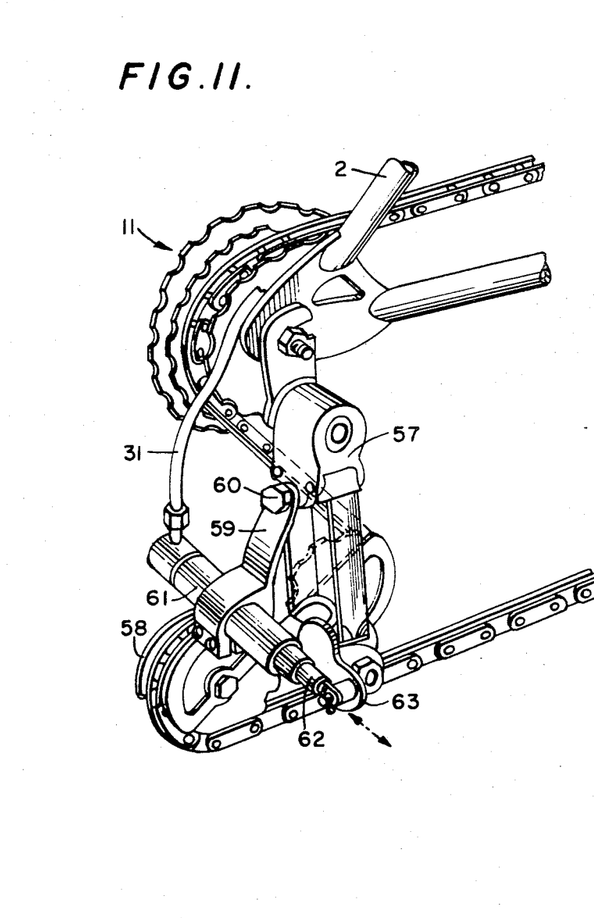
FIG. 11 is a fragmentary perspective view of a second form of hydraulic shifter.

Referring now to FIG. 11, a further modification of the invention is shown and in this form of the invention, a bracket or clamp 59 is suitably secured to one side of the mechanism assembly 57 of a conventional derailleur mechanism as by means of a bolt 60 or the like. A slave cylinder 61 is adjustably clamped in the lower end of the bracket 59 and any suitable means such as a bellows or piston or the like is carried in the cylinder 61. A piston rod 62 extends from within the cylinder and is connected at its outer end with a bracket 63 connected with the lower end of a conventional parallelogram type mechanism assembly 57 for reciprocating the lower end of the mechanism assembly upon reciprocation of the piston rod 62 incident to pressurization of the fluid within the cylinder 61 via the conduit 31 from the master cylinder 22 on the handlebar 9.

Figure 12:
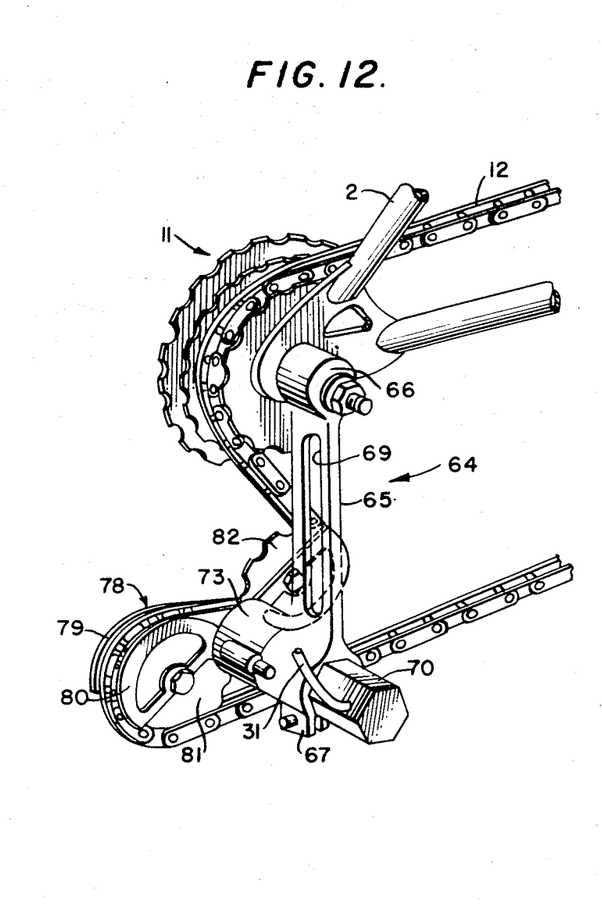
FIG. 12 is a fragmentary perspective view of a third from of hydraulic shifter.
Figure 13:
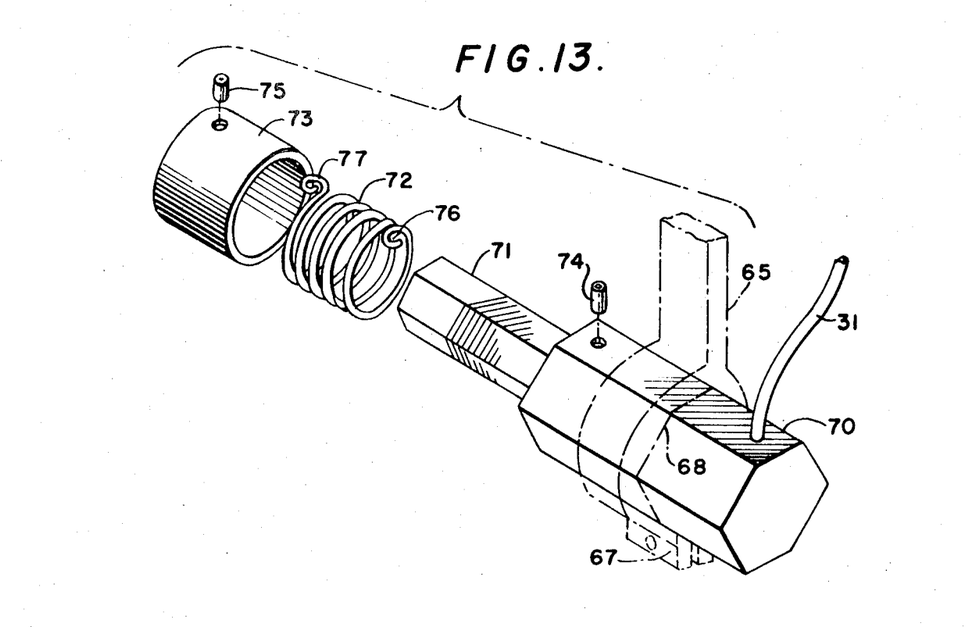
FIG. 13 is an exploded perspective view of the hydraulically operated means for operating the derailleur of FIG. 12.

A third form of the invention is shown in FIGS. 12 and 13, and in this form of the invention an exceptionally simple shifting mechanism 64 is attached to the frame 2 adjacent the rear sprocket set 11 for effecting transfer of the chain from one size sprocket to another.

The shifting mechanism 64 comprises an elongate frame or support 65 having an enlarged portion 66 at one end thereof with a bore therethrough for receiving the end of the axle of the rear wheel to support the frame 65 on the frame 2 of the bicycle in a generally vertically downwardly extending position. The lower end of the frame or support 65 is enlarged and bifurcated as at 67 and has an enlarged polygonally shaped opening 68 therethrough. An elongate slot 69 is formed in the frame or support 65 for reducing the weight of the shifting mechanism.

A hydraulically operated slave cylinder 70 having a polygonal cross section is axially adjustably held in the bore 68 in the bifurcated end 67 of the frame or support 65. A piston 71 having a polygonal cross section is fitted within the cylinder 70 for reciprocation therewithin when fluid pressure is admitted to the cylinder via conduit 31 from the master cylinder 21 on the handlebar 9. A combination torsion and tension spring 72 is received coaxially over piston rod 71 and an end cap 73 is received coaxially over the spring 72 and over the piston 71. A pair of pins 74 and 75 extend through the walls of the cylinder 70 and cap 73, respectively, and through a pair of looped ends 76 and 77 on the spring 72 to couple the cap 73 and cylinder 70 for relative resilient torsional and longitudinal movement therebetween. A conventional idler assembly 78 is connected to the outer end of cap 73 for movement therewith and comprises inner and outer cage plates 79 and 80, respectively, with a pair of idler wheels 81 and 82 rotatably held therebetween and over which the chain is disposed.

In operation, fluid pressure is introduced into cylinder 70 via conduit 31 to cause axial movement of piston rod 71 and cap 73 which carries the idler assembly 78 and thus causes the idler assembly to move toward or away from the sprocket set 11 to cause the chain to walk or ride from one sprocket onto another sprocket. The torsion spring 72 maintains tension on the chain by resiliently biasing the idler assembly 78 in a clockwise direction as viewed in FIG. 12. In this form of shifting mechanism, the only movement is a simple, reciprocating movement as determined by the cylinder and cap assembly for causing the idler assembly to move laterally relative to the sprocket set to move the chain sideways to cause it to walk onto different sized sprockets. The polygonal cross section of the cylinder and piston prevents the cylinder from turning under the force exerted thereon by the chain and idler assembly. If desired, the cylinder could be round and only the rod made polygonal, or other suitable means could be employed to prevent the cylinder from turning.

Accordingly, the construction and operation of the shifting mechanism is exceptionally simple, and repair and adjustment of the shifting mechanism is easily accomplished.

Figure 14:
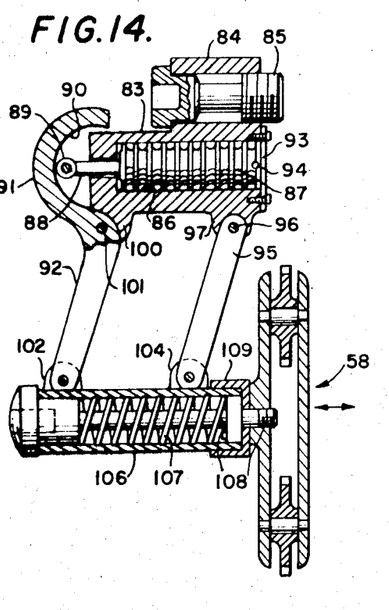
FIG. 14 is a sectional view in elevation of a fourth form of derailleur mechanism.
Figure 15:
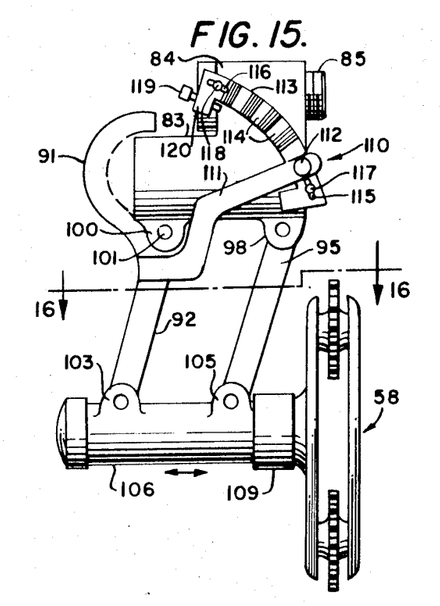
FIG. 15 is a view in elevation of the derailleur mechanism of FIG. 14.
Figures 16, 17:
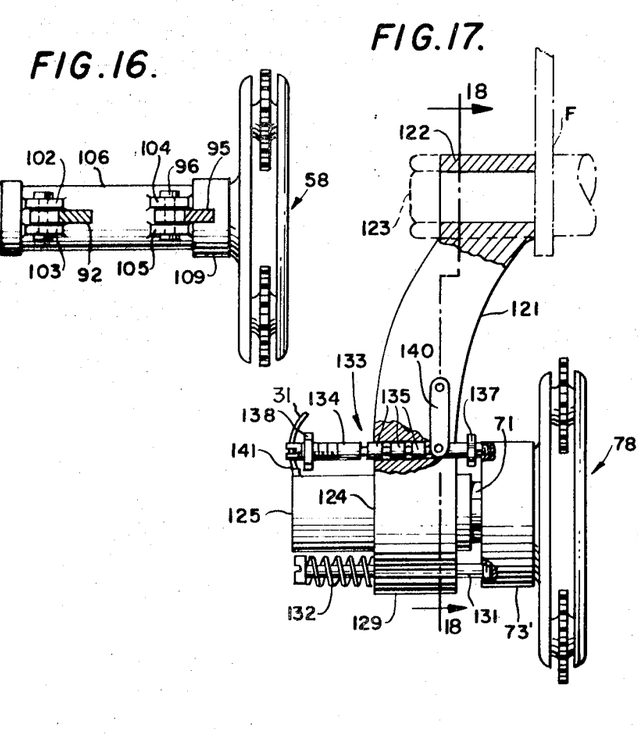
FIG. 16 is a horizontal sectional view of the derailleur of FIG. 15 and is taken along line 16—16.
FIG. 17 is a view in elevation, shown partly in section, of a fifth form of derailleur mechanism.

In FIGS. 14 through 16, a fourth form of derailleur mechanism is illustrated and comprises a housing 83 having an upstanding attaching bracket 84 thereon with a bolt 85 extended therethrough for attachment of the housing to the frame of the bicycle or the like.

An axial bore 86 is formed in the housing 83 and a suitable bellows or piston or the like 87 is fitted therewithin and has an actuating rod 88 extending axially from one end thereof through one end of the housing 83.

A roller 89 is on the end of the actuating rod 88 and engages an arcuate cam surface 90 on the inside of an arcuate generally cup-shaped actuating lever 91 formed integrally at the upper end of a link 92. The bellows or the like 87 is confined within the bore 86 and housing 83 by means of a plate 93 suitably secured over the other end of the housing 83 and an inlet passageway 94 is provided in the other end of the housing in communication with the bellows 87 for causing expansion and contraction thereof.

A second link 95 is pivotally connected at its upper end by means of a pivot pin 96 extending through a pair of depending bifurcated lugs 97 and 98 between which the upper end of the link 95 is received. The upper end of link 92 adjacent the juncture thereof with arcuate actuating arm 91 is similarly pivotally mounted between a pair of depending bifurcated lugs or ears 99 and 100 at said one end of the housing 83 by means of a pin 101 extending through the ears or lugs 99 and 100 and the upper end of link 92.

The links 92 and 95 are disposed parallel to one another and the lower ends thereof are pivotally connected between respective pairs of upstanding ears or lugs 102, 103 and 104, 105, respectively, integrally formed on the upper side of a derailleur supporting cylinder 106 having a torsional spring 107 therein and connected to a rod or shaft 108 to which the derailleur mechanism 58 is rigidly connected. A rearwardly projecting cylindrical cap or collar 109 is carried by the derailleur mechanism 58 and is rotatably positioned over the end of cylinder 106.

As seen in FIG. 15, a detent and indicating mechanism 110 is carried by link 92 and housing 83, respectively, in this form of the invention rather than adjacent the master cylinder as in the previous forms of the invention. The detent and indicating mechanism 110 comprises an arm 111 rigidly connected with the link 92 adjacent the upper end thereof and having a ball or pin or other projecting means 112 at the free end thereof arranged to ride on an arcuate track 113 having a plurality of teeth or detents 114 thereon corresponding to the number of gears or sprockets at the rear wheel.

The projection 112 carried by the arm 111 rides on the track 113 and as the projection 112 engages each of the teeth 114, the rider of the bicycle or the like is enabled to determine both through feel and through an audible click thus produced when the shifting mechanism is in a position corresponding to one of the sprockets or gears provided.

The arcuate track 113 has slots 115 and 116 in the opposite ends thereof through which pins 117 and 118 are received, respectively, and an adjusting nut or bolt 119 is extended through a depending lug 120 on the arm 113 for adjusting the arm 113 to a proper operative position.

Figure 18:
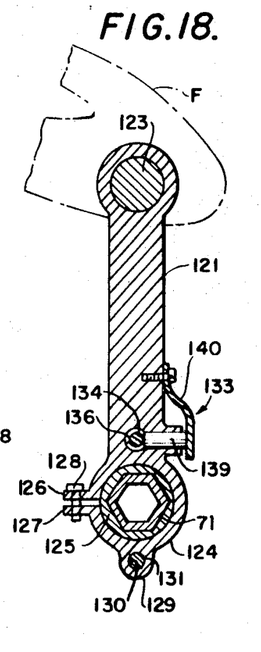
FIG. 18 is a view in section taken along line 18—18 in FIG. 17.

In FIG. 17 and 18, a fifth form of the derailleur mechanism is illustrated and comprises a curved arm 121 having an integral cylinder or bracket 122 at the upper end thereof through which a bolt or the like 123 is extended into the frame F of the bicycle or the like.

A split clamping cylinder 124 is formed integrally at the lower end of the arm 121 and an actuating cylinder 125 similar to the cylinder 70 previously described is axially adjustably received therethrough. The split cylinder 124 has a pair of radially projecting lugs or ears 126 and 127 on one side thereof with a screw or bolt or the like 128 extended therethrough by means of which the cylinder may be selectively tightened and loosened to enable adjustment of the cylinder 125 therein.

A piston 71 is reciprocably received in the cylinder 125 and has a polygonal cross sectional configuration as in FIG. 13 and carries a cap 73' at the outer end thereof to which the idler assembly 78 is connected. A depending boss 129 is formed on the underside of clamping cylinder 124 and has a bore 130 therethrough through which a rod or pin 131 is slidably received. The rod or pin 131 is adjustably threadably engaged in the cap 73' and a coil compression spring 132 is positioned between the head of the pin 131 and the boss 129 for effecting return of the idler assembly 78 to the position shown in FIG. 17.

The threadably adjusted rod or pin 131 enables the tension or preload on a spring 132 to be adjusted.

A combination detent-indicating means and limit stop means 133 is carried by the cap 73' and comprises an elongate rod or pin 134 having a plurality of lands or enlargements 135 thereon slidably received through a bore 136 in the arm 121 adjacent the clamping cylinder 124. The pin 134 is threadably adjustably engaged with the cap 73' to permit relative adjustment therebetween, and the pin carries a pair of stop nuts 137 and 138 at the opposite ends thereof, respectively, for engaging the opposite sides of the arm 121 to limit the travel of the piston 71 and idler assembly 78. The stop nut 138 is adjustably threadably engaged on the pin 134 for adjusting the position of the limit stops.

A pin 139 is slidably received through a bore 140 in the side of arm 121 for engagement at one end with the bosses or enlargements 135 on pin 134 and a leaf spring member 140 is attached to the side of arm 121 at one end and has the other end thereof in engagement with the other end of the pin 139 for urging the pin inwardly against the rod or pin 134.

An inlet 141 is provided at the outer end of actuating cylinder 125 for supplying hydraulic fluid to the bellows or piston actuator therein to cause movement of the idler assembly 78.

Figure 19:
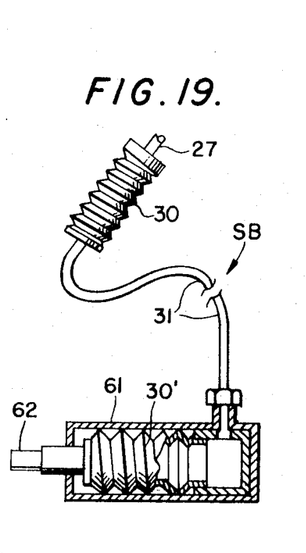
FIG. 19 is a schematic perepective view with a portion thereof broken away of a sealed bellows system used to operate the shifter.

In FIG. 19, a sealed hydraulic bellows system is indicated generally at SB, and comprises the bellows 30 at the handlebar, conduit 31 and a bellows 30' in the housing 61 at the wheel. The bellows and conduit are vacuum filled and sealed to one another at the factory and require no filling or bleeding prior to use thereof. A sealed bellows system could be used in all forms of the invention, and at either sprocket, as desired.

In each of the forms of the invention described hereinabove, any number of sprockets in the rear sprocket set could be provided and the front shifter could be eliminated, if desired. Further, the hydraulic lines for conveying pressure fluid from the master cylinders to the slave cylinders could be confined or disposed within the tubular frame or clamped externally thereto as desired, and may comprise relatively rigid members such as steel tubing or the like as desired.

Still further, the several components comprising the various forms of the invention described and illustrated herein can be made from any suitable material such as aluminum, steel, plastic or the like.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A hydraulically actuated shift mechanism for bicycles and the like, comprising, hydraulic master cylinder means supported on the bicycle, hand manipulatable means operatively connected with said master cylinder means and positioned to be readily grasped by the hand of a rider of said bicycle to actuate said master cylinder means, hydraulic slave cylinder means supported on said bicycle adjacent a sprocket means on said bicycle, conduit means connected with said master cylinder means and said slave cylinder means for conveying pressure fluid from said master cylinder means to said slave cylinder means, and a shifting means carried by an operating member of said slave cylinder means for movement therewith responsive to actuation of said master cylinder means, said shifting means being in engagement with a chain on said sprocket means so that movement of said shifting means causes movement of said chain from one size sprocket to another size sprocket in said sprocket means.

2. A hydraulically actuated shift mechanism as in claim 1, wherein said shifting means comprises a derailleur mechanism supported on the frame of said bicycle adjacent the rear sprocket means thereof, said derailleur mechanism including a fixed portion supported on said frame and a movable portion spaced substantially vertically downwardly from said fixed portion, idler means carried by said movable portion and in engagement with said chain on said sprocket means, said movable portion being movable in response to actuation of said master cylinder means and said slave cylinder means for reciprocating said idler means in a direction parallel to the axis of rotation of said sprocket means for causing the chain to move from one size sprocket to another size sprocket in said sprocket means.

3. A hydraulically actuated shift mechanism as in claim 2, wherein said derailleur mechanism comprises a conventional parallelogram type derailleur, a flexible cable means connected at one end to the movable portion of said parallelogram type derailleur and at the other end to an adapter block carried by a piston rod reciprocally mounted in said slave cylinder means for reciprocation responsive to pressurization of fluid in said slave cylinder means to cause actuation of said derailleur, said slave cylinder means being supported on the frame of said bicycle adjacent said parallelogram type derailleur mechanism.

4. A hydraulically actuated shift mechanism as in claim 2, wherein said derailleur mechanism comprises a substantially conventional parallelogram type derailleur mechanism, depending bracket means secured to said fixed portion of said derailleur mechanism, said slave cylinder means being supported in said bracket means adjacent said movable portion of said derailleur mechanism, a piston rod extending from one end of said slave cylinder means and connected to a bracket connected with said movable portion of said derailleur mechanism for causing reciprocation of said movable portion upon actuation of said piston rod in response to pressurization of fluid in said slave cylinder means.

5. A hydraulically actuated shift mechanism as in claim 2, wherein said derailleur mechanism comprises an elongate support frame connected at one end to the frame of the bicycle adjacent said sprocket means and extending substantially vertically downwardly therefrom, the other end of said support frame having an enlarged bore therethrough, said hydraulic slave cylinder means supported in said bore in a direction parallel to the axis of said sprocket means, said idler means being carried by a piston rod extending into said hydraulic slave cylinder means for reciprocation responsive to pressurization of fluid in said hydraulic slave cylinder means, said chain being in engagement with said idler means and movable thereby from one size sprocket to another size sprocket upon reciprocation of said piston rod and said idler means.

6. A hydraulically actuated shift mechanism as in claim 5, wherein said bore in said other end of said support frame is polygonal in cross section and said hydraulic slave cylinder means is similarly polygonally shaped for complementary engagement with the bore in said support frame, said idler means being carried by a cap means connected to said piston rod for reciprocation therewith, and spring means interconnecting said cap means with said piston rod for relative resilient rotational movement therebetween.

7. A hydraulically actuated shift mechanism as in claim 2, wherein said master cylinder means is confined in a housing means connected with the handlebar of said bicycle, and said hand manipulatable means comprises a lever means pivotally mounted on said housing means and having an actuating rod extending therefrom into said master cylinder means for pressurizing the fluid in said master cylinder means upon actuation of said lever means.

8. A hydraulically actuated shift mechanism as in claim 7, wherein a click-type indicating means is operatively associated with said actuating rod connected with said lever for indicating the position of said lever, said click-type indicating means including ball and detent means for indicating each of several different positions of said lever.

9. A hydraulically actuated shift mechanism as in claim 8, wherein said shifting means further includes a front shifter adjacent a front sprocket means of said bicycle, said front sprocket means including two different sized sprockets, said front shifter means including a hydraulic slave cylinder means, a crescent shaped elongate chain guide and support means carried on a piston rod reciprocally mounted in said hydraulic slave cylinder means for reciprocation to move the chain from one sprocket to the other sprocket in said front sprocket means.

10. A hydraulically actuated shift mechanism as in claim 9, wherein said hand manipulatable means includes a second lever pivotally mounted to said housing means on said handlebar and operatively connected through an actuating rod with a second master cylinder confined in said housing, said second master cylinder being connected with said slave cylinder means on said front shifter for operating said front shifter incident to actuation of said second lever.

11. A hydraulically actuated shift mechanism as in claim 10, wherein said derailleur mechanism comprises a conventional parallelogram type derailleur, a flexible cable means connected at one end to the movable portion of said parallelogram type derailleur and at the other end to an adapter block carried by a piston rod reciprocally mounted in said slave cylinder means for reciprocation responsive to pressurization of fluid in said slave cylinder means, said slave cylinder means being supported on the frame of said bicycle adjacent said parallelogram type derailleur mechanism.

12. A hydraulically actuated shift mechanism as in claim 10, wherein said derailleur mechanism comprises a substantially conventional parallelogram type derailleur mechanism, depending bracket means secured to said fixed portion of said derailleur mechanism, said slave cylinder means being supported in said bracket means adjacent said movable portion of said derailleur mechanism, a piston rod extending from one end of said slave cylinder means and connected to a bracket connected with said movable portion of said derailleur mechanism for causing reciprocation of said movable portion upon actuation of said piston rod in response to pressurization of fluid in said slave cylinder means.

13. A hydraulically actuated shift mechanism as in claim 10, wherein said derailleur mechanism comprises an elongate support frame connected at one end to the frame of the bicycle adjacent said sprocket means and extending substantially vertically downwardly therefrom, the other end of said support frame having an enlarged bore therethrough, said hydraulic slave cylinder means supported in said bore in a direction parallel to the axis of said sprocket means, said idler means being carried by a piston rod extending into said hydraulic slave cylinder means for reciprocation responsive to pressurization of fluid in said hydraulic slave cylinder means, said chain being in engagement with said idler means and movable thereby from one size sprocket to another size sprocket upon reciprocation of said piston rod and said idler means.

14. A hydraulically actuated shift mechanism as in claim 2, wherein said derailleur mechanism comprises a housing supported to the frame of the bicycle and having a bore therein, said slave cylinder means being positioned in said bore of said housing, a pair of parallel depending links pivotally connected to said housing and extending substantially vertically downwardly therefrom, one of said links having an arcuate camming surface rigidly connected thereto and adapted to be engaged by an actuating rod extending through said housing from said slave cylinder means, and an idler assembly carried on a support means connected at the lower ends of said links in substantially parallel relationship to said housing.

15. A hydraulically actuated shift mechanism as in claim 14, wherein a click-type indicating means is operatively associated with said housing and one of said links on said derailleur mechanism for indicating the position of the shift lever and the idler means, said click-type indicating means including detent means and means carried by an arm rigidly connected with said one link for engaging said detent means to indicate each of several different positions of said lever.

16. A hydraulically actuated shift mechanism as in claim 5, wherein said elongate frame is curved in a plane parallel to the axis of said sprocket means and said hydraulic slave cylinder means is axially adjustably supported in a split cylinder or sleeve at the lower end of said support frame, said idler means being carried by a cap means connected to said piston rod for reciprocation therewith, and spring means interconnecting said cap means with said piston rod for relative resilient rotational movement therebetween.

17. A hydraulically actuated shift mechanism as in claim 16, wherein a click-type indicating means is operatively associated with said cap means and said frame support for indicating the position of said lever and of said idler means, said click-type indicating means including a detent means and a cooperating pin means for indicating each of several different positions of said lever, said detent means comprising an elongate rod slidably received through a portion of said frame support in a direction parallel to the axis of said sprocket, and said pin means slidably received through a bore in said frame support in a direction perpendicular to the axis of said rod.

18. A hydraulically actuated shift mechanism as in claim 17, wherein limit stop means is provided on said rod for limiting the extent of travel of said piston rod and idler means.

19. A hydraulically actuated shift mechanism as in claim 18, wherein a return spring is interposed between a pin and said frame support for urging said pin in a first direction, said pin being operatively connected with said cap means so that said cap means and idler means are urged in said first direction along with said pin means.

20. A hydraulically actuated shift mechanism for bicycles and the like, comprising, a factory sealed hydraulic system including a hydraulic master cylinder means on said bicycle and having a first pressure responsive means therein and hand manipulatable means connected thereto for actuation of said pressure responsive means, hydraulic slave cylinder means on said bicycle adjacent a sprocket of said bicycle and having a second pressure responsive means therein, conduit means sealingly connected to each of said pressure responsive means and extending therebetween to convey pressure fluid from said first pressure responsive means to said second pressure responsive means, and a shifting means carried by a reciprocating portion of said slave cylinder means for reciprocation therewith responsive to actuation of said master cylinder means, said shifting means being in engagement with a chain on said sprocket means so that reciprocation of said shifting means causes movement of said chain from one size sprocket to another size sprocket in said sprocket means, said factory sealed hydraulic system eliminating the necessity of bleeding and filling said system prior to use thereof.

21. A hydraulically actuated shift mechanism as in claim 20, wherein said pressure responsive means comprises a bellows, and said bellows and conduit means are vacuum filled and sealed at the factory.

* * * * *